No. 677,881. Patented July 9, 1901.
T. L. McELROY.
TROLLEY.
(Application filed Oct. 5, 1900.)
(No Model.)
FIG. 1.
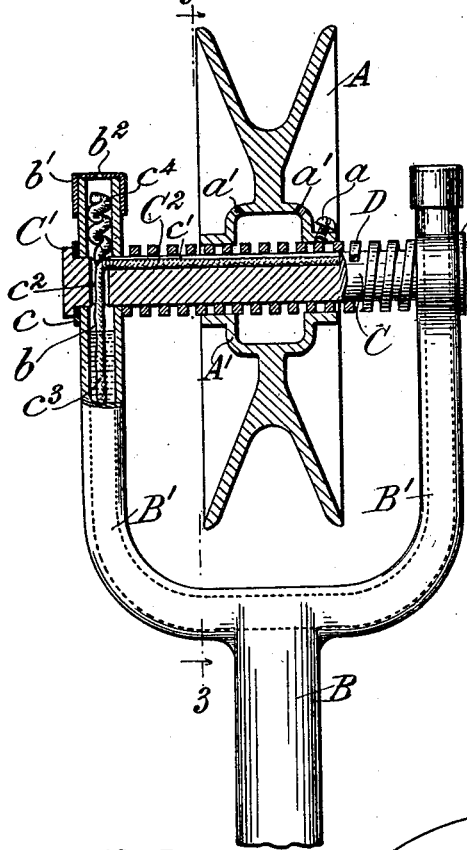
FIG. 2.
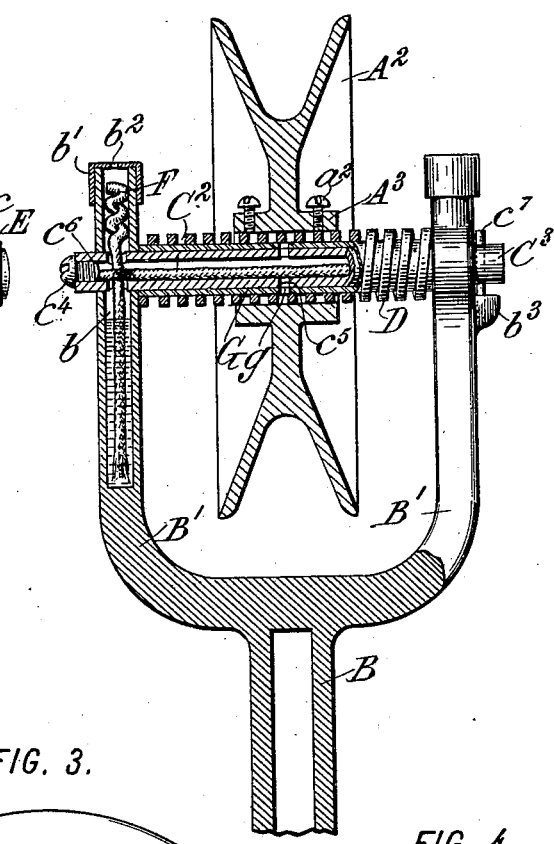
FIG. 3.
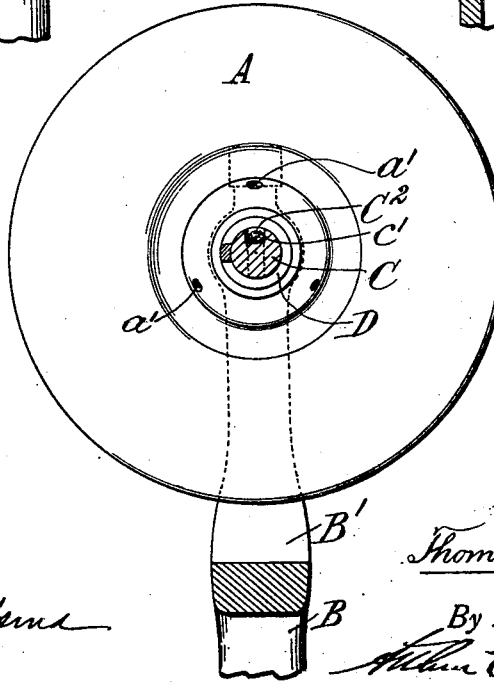
FIG. 5.
FIG. 4.
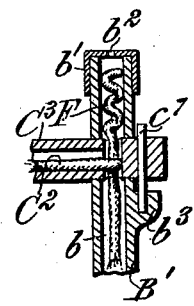
WITNESSES:
Domingo N. Usina
Fred White
INVENTOR:
Thomas L. McElroy,
By Attorneys,
THE NORRIS PETERS CO., PHOTO-LITHO., WASHINGTON, D. C.

# UNITED STATES PATENT OFFICE.

THOMAS L. McELROY, OF BROOKLYN, NEW YORK, ASSIGNOR OF TWO-THIRDS TO FREDERICK A. THOMAS, OF NEW YORK, AND THEODORE HONEGGER, OF NEW BRIGHTON, NEW YORK.

TROLLEY.

SPECIFICATION forming part of Letters Patent No. 677,881, dated July 9, 1901.

Application filed October 5, 1900. Serial No. 32,107. (No model.)

*To all whom it may concern:*

Be it known that I, THOMAS L. MCELROY, a citizen of the United States, residing in Brooklyn, in the county of Kings, city and State of New York, have invented certain new and useful Improvements in Trolleys, of which the following is a specification.

My invention provides an improved trolley-wheel adapted to be used in the ordinary underrunning trolley of electric railways having overhead conductors.

My invention provides a trolley which is simply and efficiently lubricated and which carries a supply of lubricant sufficient to last for a considerable length of time.

It provides also a trolley of which the wheel makes very intimate electrical connection with the fork of the trolley and in which the wheel is allowed to yield slightly from side to side without injuring the degree of electrical connection.

It provides also a trolley having various other points of advantage, all of which will be specifically set forth in the following specification.

Referring to the accompanying drawings, showing embodiments of my invention, Figures 1 and 2 are elevations, partly in section, of my trolley, including the fork of the trolley and the wheel, the view being in the direction of the plane of the wheel. Fig. 3 is a section of Fig. 1 on the line 3 3. Fig. 4 is a section through the right-hand end of the shaft $C^3$ of Fig. 2. Fig. 5 is a section similar to that of Figs. 1 and 2, illustrating a modification.

The principal elements of my trolley are a wheel revolving on a fixed shaft, a hollow fork carrying said shaft and adapted to carry a supply of lubricant, and means for feeding the lubricant from the reservoirs in the fork to the wheel. An additional feature of my invention and which may be used with or without the lubricating means described is the mounting of the wheel on a spring which surrounds the shaft. Said spring turns with the wheel and makes intimate contact from the wheel to each of the side arms of said fork. It thus allows considerable side play of the wheel without lessening the degree of contact with the side arms of the fork.

Referring to Fig. 1, A is the wheel, and B the trolley, having at its end a fork comprising arms B' B'. A shaft C is held non-rotatively between the arms B' B' in any suitable manner. Within the hub of the wheel A and attached thereto, as by a set-screw $a$, is a spring D, extending under a slight compression from one arm B' to the other. The wheel is attached to the spring at about its middle point, so that the wheel shall be midway between the arms of the fork under normal conditions. Each of the forks B' B' is hollow, as shown at $b$, and adapted to contain a supply of oil. A cap $b'$ covers the end of the fork B'. In the construction shown in Fig. 1 the shaft C consists of a bolt having a head C' and screw-threaded at its opposite end. A nut E is screwed on the screw-threaded end of the shaft C, and being screwed tightly against the fork B' is sufficient to hold the shaft C non-rotatively in position. Washers $c$, of rubber or the like, prevent leakage of the oil. The shaft is provided along its upper side with a channel $c'$ and near its opposite ends with diametral passages $c^2$, registering with the hollow spaces $b$ in the arms of the fork and with the channel $c'$. For the purpose of carrying the oil to the shaft C, I use a wick $C^2$, which depends at its ends $c^3$ into the oil in the chambers $b$. In the upper part of the chamber $b$ I insert also an additional packing, such as a piece of wicking $c^4$, which prevents the oil from shaking out when the trolley is in use. The oil is carried by capillary attraction up the ends of the wick $c^3$ and to the portion $C^2$, lying within the groove $c'$, whence it is drawn into the space between the spring D and the shaft C and lubricates the passage of the pulley about the shaft. For positively drawing the oil out of the wick $C^2$, I form the wheel A with a hollow hub A', which at its outermost portion is provided with any convenient number of perforations $a'$. The rotation of the wheel A exerts a centrifugal force on the air within the hollow hub A', which air escaping through the perforations $a'$ causes a suction along the wick $C^2$ sufficient to moisten the inner surface of the spring D as it passes over the groove $c'$. This spring D then carries the oil entirely around the surface of the shaft D, and thus lubricates the whole completely. The cap $b'$ is perforated at $b^2$, so as to admit air to the chamber $b$ to take the place of the oil drawn out of it. This perforation $b^2$ will only be necessary where the wick is so large as to entirely fill the groove $c'$ at the point where the shaft C enters the fork B'.

In Fig. 2 the principal elements are the same, some modifications thereof being shown. The wheel $A^2$ has a solid hub $A^3$, the spring D being fastened to the hub of the wheel by set-screws $a^2$, passing through said hub. The shaft $C^3$ is hollow, its open end being stopped by a screw or other plug $c^4$. For the escape of the oil it is provided with passages $c^5$. One wick extends from end to end of the hollow in the shaft $C^3$, and other separate wicks F extend through vertical passages $c^6$ in the shaft down into the oil in the chamber $b$ and are packed in the upper part of the chamber, so as to prevent the splashing of oil. The cover $b'$, perforated at $b^2$, is especially useful in this form of the invention. In order that the spring shall turn most freely about its shaft, a bushing G, of lubricating composition, such as mixtures of metal with a lubricant, is driven over the metal part of the shaft C, and the spring rotates on this bushing, being entirely free between the ends of the bushing and the forks, as shown. The bushing is perforated at $g$ to register with the perforations $c^5$ of the shaft $C^3$. For maintaining the shaft $C^3$ in any desired fixed position one of the forks B' is provided with a lug $b^3$, cored in a vertical direction. The shaft $C^3$ is perforated, and a pin $c^7$ passes through the end of the shaft $C^3$ and into the lug $b^3$, thereby holding the shaft against longitudinal or rotative movement. The operation is very similar to that of the form shown in Fig. 1. The oil is sucked up by the wicks F, which are in contact with the wick $C^2$, the latter carrying the oil along inside the shaft C to the holes $c^5$, whence it passes out to the outer surface of the bushing G and the space between said bushing and the spring D. The shaft C in the Fig. 2 construction is solid at its right-hand end, as shown in Fig. 4.

It will be seen that the trolley of my invention is simple and efficient, that it will carry a large supply of lubricant sufficient to last for several days, that the wheel revolves on its shaft with the minimum amount of friction, and yet maintains a good spring-contact with the metallic arms of the fork, and that the more rapid the revolution of the wheel the faster is the lubricating action, so that said lubricating action is automatically regulated according to the needs of the case. My improved trolley is also easily taken apart for repairs, and when the wheel becomes much worn it can be replaced without having to discard the various other elements of the device.

Though I have described with great particularity of detail certain embodiments of my invention, it will be understood that I am not limited to the specific features shown and described.

Many modifications of the individual parts and in the arrangement of the parts are possible to those skilled in the art without departing from the spirit of my invention. For example, the space $b$ in the fork B' may be continuous, as shown by dotted lines in Fig. 1, or it may only extend in two separate chambers into the arms of the fork, as shown in Fig. 2.

The means of fastening the spring to the wheel may also be varied, as shown in Fig. 5. In this construction the hub $A^4$ of the trolley-wheel is hollowed out, as shown at $a^4$. The spring D being inserted in place, the hollow $A^4$ is filled with Babbitt metal or the like $a^5$, which fills the hollow $a^4$ and enters to a slight extent between the rings of the spring D, thereby holding the wheel and the spring firmly together. G shows the bushing of Fig. 2, and $C^3$ the hollow shaft of the same figure; but it is evident that the same mode of fastening the spring to the wheel may be utilized with the shaft C of Fig. 1.

A hood M, Fig. 5, may be fastened to the arms of the fork and extended over the spring to prevent wear on the same from the trolley-wire when the wheel is accidentally thrown off the wire. Each hood M makes sliding contact with the hub of the wheel and is electrically connected with its fork, so as to provide an easy path of very little resistance for the current.

What I claim, therefore, and desire to secure by Letters Patent, are the following-defined novel features in combination, each substantially as described:

1. In a trolley, the combination of a hollow fork adapted to carry a supply of lubricant, a shaft fixed non-rotatively in said fork, a wheel mounted to rotate on said shaft, said shaft having a groove at its upper surface and having a passage at its end and a wick lying in said groove, passing through said passage and having its end inserted into the oil in said hollow fork.

2. In a trolley, the combination of an oil-reservoir, a shaft C having a groove $c'$ in its surface, a passage $c^2$ at its end communicating with said groove, and a wick $C^2$ lying in said groove and extending through said passage into said oil-reservoir.

3. In a trolley the combination of a hollow fork, a shaft in said fork, and a wheel on said shaft, said wheel having a hollow hub A' with perforations $a'$ near its outermost portion.

4. In a trolley, the combination of a shaft, a spring surrounding said shaft, and a wheel at approximately the middle portion of said spring, said spring bearing at its outer ends against the forks of the trolley, whereby said wheel is held yieldingly in a middle position and is maintained in electrical connection with the fork under all conditions.

5. In a trolley, the combination of a shaft, a spring surrounding said shaft, and a wheel at approximately the middle portion of said spring, and a hood M extended over said spring, said spring bearing at its outer ends against the forks of the trolley, whereby said wheel is held yieldingly in a middle position and is maintained in electrical connection with the fork under all conditions.

6. In a trolley, the combination of a shaft, a spring surrounding said shaft, a wheel at approximately the middle portion of said spring, and a hood M connected to said fork and making sliding contact with said wheel, said spring bearing at its outer ends against the forks of the trolley, whereby said wheel is held yieldingly in a middle position and is maintained in electrical connection with the fork under all conditions.

7. In a trolley the combination of a non-rotative shaft, a spring surrounding said shaft and adapted to rotate thereon, and a wheel attached to said spring at approximately its middle portion, said spring bearing at its ends against the forks of the trolley, whereby said wheel is held yieldingly in a middle position and is maintained in electrical connection with the fork under all conditions.

8. In a trolley the combination of a non-rotative shaft, a bushing of lubricating composition thereon, a spring surrounding said bushing so as to rotate thereon, and a wheel fixed to said spring at about its middle point, said spring bearing at its ends on the inside of the fork, whereby said wheel is held yieldingly in a middle position and maintained in electrical contact with said fork.

In witness whereof I have hereunto signed my name in the presence of two subscribing witnesses.

THOMAS L. McELROY.

Witnesses:
DOMINGO A. USINA,
FRED WHITE.